(12) United States Patent
Setiawan et al.

(10) Patent No.: US 10,933,895 B2
(45) Date of Patent: Mar. 2, 2021

(54) CONTROL ARRANGEMENTS FOR MAINTENANCE OF A COLLECTION OF PHYSICAL DEVICES AND METHODS FOR CONTROLLING MAINTENANCE OF A COLLECTION OF PHYSICAL DEVICES

(71) Applicant: HITACHI, LTD., Tokyo (JP)

(72) Inventors: Bondan Setiawan, Singapore (SG); Yoriko Kazama, Singapore (SG); Wujuan Lin, Singapore (SG)

(73) Assignee: HITACHI, LTD., Tokyo (JP)

( * ) Notice: Subject to any disclaimer, the term of this patent is extended or adjusted under 35 U.S.C. 154(b) by 232 days.

(21) Appl. No.: 16/318,939

(22) PCT Filed: Dec. 21, 2017

(86) PCT No.: PCT/SG2017/050630
§ 371 (c)(1),
(2) Date: Jan. 18, 2019

(87) PCT Pub. No.: WO2019/125301
PCT Pub. Date: Jun. 27, 2019

(65) Prior Publication Data
US 2020/0079403 A1 Mar. 12, 2020

(51) Int. Cl.
*B61L 15/00* (2006.01)
*B61L 27/00* (2006.01)
*G06Q 10/00* (2012.01)

(52) U.S. Cl.
CPC ....... *B61L 15/0081* (2013.01); *B61L 15/0018* (2013.01); *B61L 15/0072* (2013.01); *B61L 27/0094* (2013.01)

(58) Field of Classification Search
CPC ..... G06Q 10/00; B61L 15/00; B61L 15/0081; B61L 15/0018; B61L 15/0072; B61L 27/00; B61L 27/0094
See application file for complete search history.

(56) References Cited

U.S. PATENT DOCUMENTS

| 2013/0111490 A1 | 5/2013 | Baruch et al. |
| 2014/0200830 A1* | 7/2014 | Bhattacharjya ....... B61L 23/042 702/34 |
| 2014/0336791 A1* | 11/2014 | Asenjo ................. G06Q 10/06 700/44 |

(Continued)

FOREIGN PATENT DOCUMENTS

EP 2801938 A1 11/2014

*Primary Examiner* — Tan Q Nguyen
(74) *Attorney, Agent, or Firm* — Volpe Koenig (57) ABSTRACT

According to various embodiments, there is provided a control arrangement for maintenance of a collection of physical devices, the control arrangement including: a receiver configured to receive observation data, the observation data representative of physical conditions of each physical device of the collection of physical devices; a processor configured to compute respective maintenance output data of maintaining different combinations of the physical devices, based on the observation data; and a controller configured to determine the combination of the physical devices to be maintained based on a comparison of the computed respective maintenance output data, the controller further configured to control maintenance of the determined combination of the physical devices.

13 Claims, 7 Drawing Sheets

(56) References Cited

U.S. PATENT DOCUMENTS

2016/0078695 A1* 3/2016 McClintic ............ G07C 5/0816
 701/29.4
2018/0308292 A1* 10/2018 Ganguli .................. G08G 1/20

* cited by examiner

CONTROL ARRANGEMENTS FOR MAINTENANCE OF A COLLECTION OF PHYSICAL DEVICES AND METHODS FOR CONTROLLING MAINTENANCE OF A COLLECTION OF PHYSICAL DEVICES

TECHNICAL FIELD

Various embodiments relate to control arrangements for maintenance of a collection of physical devices and methods for controlling maintenance of a collection of physical devices.

BACKGROUND

A railway typically includes a variety of railway assets, including tracks, rolling stock, signalling system, catenary, platform doors etc. Each type of railway assets, or each group of assets, may in turn include a plurality of physical devices, for example a track may include a plurality of track segments. The maintenance operator of the railway may monitor and collect data on a railway asset, in order to plan a maintenance work schedule on the particular physical device. However, in a railway system, given the vast number of physical devices that need to be maintained and the very short time duration available for carrying out maintenance works, i.e. non-operational hours of the railway, the maintenance operator may find it challenging to perform the maintenance tasks in a manner that can both meet the operational targets, as well as being time and cost-effective.

SUMMARY

According to various embodiments, there may be provided a control arrangement for maintenance of a collection of physical devices, the control arrangement including: a receiver configured to receive observation data, the observation data representative of physical conditions of each physical device of the collection of physical devices; a processor configured to compute respective maintenance output data of maintaining different combinations of the physical devices, based on the observation data; and a controller configured to determine the combination of the physical devices to be maintained based on a comparison of the computed respective maintenance output data, the controller further configured to control maintenance of the determined combination of the physical devices.

According to various embodiments, there may be provided a method for controlling maintenance of a collection of physical devices, the method including: receiving observation data representative of physical conditions of each physical device of the collection of physical devices; computing respective maintenance output data of maintaining different combinations of the physical devices, based on the received observation data; determining the combination of the physical devices to be maintained based on a comparison of the computed respective maintenance output data; and controlling maintenance of the determined combination of the physical devices.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Embodiments described below in context of the control arrangements are analogously valid for the respective methods, and vice versa. Furthermore, it will be understood that the embodiments described below may be combined, for example, a part of one embodiment may be combined with a part of another embodiment.

It will be understood that any property described herein for a specific control arrangement may also hold for any control arrangement described herein. It will be understood that any property described herein for a specific method may also hold for any method described herein. Furthermore, it will be understood that for any control arrangement or method described herein, not necessarily all the components or steps described must be enclosed in the control arrangement or method, but only some (but not all) components or steps may be enclosed.

In this context, the control arrangement as described in this description may include a memory which is for example used in the processing carried out in the control arrangement. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

Readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

The reference to any conventional devices or systems in this specification is not, and should not be taken as an acknowledgement or any form of suggestion that the referenced conventional devices or systems form part of the common general knowledge in any country.

In order that the invention may be readily understood and put into practical effect, various embodiments will now be described by way of examples and not limitations, and with reference to the figures.

In the context of various embodiments, "observation data" may be but is not limited to being interchangeably referred to as "monitoring data".

In the context of various embodiments, "control arrangement" may be but is not limited to being interchangeably referred to as "maintenance control system".

In the context of various embodiments, "physical device" may be but is not limited to being interchangeably referred to as "asset".

Existing systems for maintaining railway assets tend to take a silo approach towards the maintenance of each asset. In other words, the existing systems fail to consider the big picture of how an asset and its surrounding assets may be maintained at the same time, to achieve better overall efficiency and lower downtime.

According to various embodiments, a maintenance control system for a facility may compute an optimized maintenance work schedule, taking into consideration a variety of assets in the facility. The maintenance control system may also determine the work schedule, based on the operational requirements set for the facility. The maintenance control system may compute maintenance output data for a plurality of different maintenance combinations. Each maintenance combination may include repairing or replacing a different selection of physical devices of the facility, for example, a first maintenance combination may consist of physical device A and its surrounding physical devices within a predefined distance; a second maintenance combination may consist of physical devices A, B and C; and a third maintenance combination may consist of physical devices A and its directly adjacent physical devices. The computed maintenance output data may be indicative of at least one of time duration to complete the maintenance work; cost to complete the maintenance work; predicted operational performance such as train frequency, train speed, length of operational distance and operational time; and predicted reliability figures such as remaining life span, mean time/distance between failure and mean time/distance to repairs. The maintenance control system may compute the maintenance output data for each maintenance combination by simulating maintenance of each maintenance combination, based on simulation models. The simulation models may be based on historical, empirical data of maintenance work schedules, or may be based on theoretical formulas. The maintenance control system may choose a combination of physical devices to be replaced or maintained, based on the computed maintenance output data, so as to optimise the maintenance output data. The maintenance control system may further control maintenance of the chosen combination of physical devices.

The maintenance control system may be used to control maintenance of a railway system. In a railway system, the collection of physical devices may include for example, but not limited to, railway track, rolling stock, signalling system, catenary and platform doors. Other than railway systems, the maintenance control system may be used to control maintenance of other facilities that include a collection of physical devices, such as any one of power subsystems and transmission lines, bridges, tunnels, telecommunications equipment, oil production equipment, medical equipment, software and client-server systems.

According to various embodiments, the maintenance control system may further include a failure predictor that may predict the failure of individual physical devices, based on observation data collected on the physical devices. The failure predictor may determine a trend or formula for determining a failure parameter based on empirical data. The failure parameter may include, for example, probability of failure, estimated remaining lifespan, or severity of failure. The failure predictor may determine the failure parameter based on the observation data collected and further based on the determined trend or formula, or based on manually-input rules. The failure predictor may automatically trigger the maintenance control system to plan a maintenance work schedule when the determined failure parameter fulfils a predetermined threshold.

According to various embodiments, the maintenance control system may further include, or may be integrated or communicatively coupled to, an operation controller. The maintenance control system may receive operation data indicative of at least one of operational targets, or operational schedule from the operation controller, so that the maintenance control system may plan the maintenance schedule to meet the operational targets, and also to work around the operational schedule. The maintenance control system may also instruct the operation controller to alter the operation schedule, or work flow of the railway, to complement the maintenance work schedule, or as an alternative solution to meeting the operational targets without carrying out maintenance work.

According to various embodiments, the maintenance control system may further include a plurality of sensors for collecting the observation data. The plurality of sensors may be attached to respective physical devices, to monitor the physical conditions of the physical devices. The plurality of sensors may transmit their collected observation data to the maintenance control system or a cloud server connected to the maintenance control system. The plurality of sensors may be an Internet of things (IoT).

Figure 1:
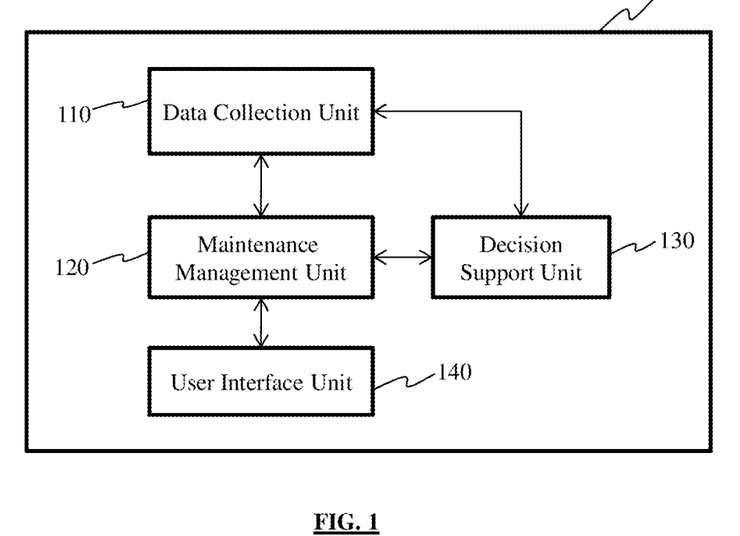
FIG. 1 shows a schematic diagram of a control arrangement according to various embodiments.

FIG. 1 shows a schematic diagram of a control arrangement 100, in other words, a maintenance control system, according to various embodiments. The control arrangement 100 may include a plurality of units, including a data collection unit 110, a maintenance management unit 120, a decision support unit 130, and a user interface unit 140. These units may be individual computational modules, or may also be individual running process instances programmed in one or more processing devices such a Central Processor Unit (CPU), a Graphical Processing Unit (GPU), a microcontroller or other processors. These units may utilize any combination of one or more computer readable mediums) for data processing. These units may be connected through communication bus(es) to communicate with external devices such as sensors and actuators. The control arrangement 100 may be a computer system in the form of a personal computer (PC) or a server computer which may have an Operating System (OS) on top of hardware that may include the CPU and computer readable medium as mentioned above, input and output devices, and communication interface such as Ethernet to connect to Local Area Network (LAN), which may also be connected to the internet or Wide Area Network (WAN), where other related devices may also be connected. The communication among these units may be performed by, for example but not limited to, the Inter-Process Communication (IPC) mechanism.

The data collection unit 110 may collect and manage information about the physical devices. The collected information, also referred herein as observation data or monitoring data, may include for example, real-time data collected from sensors attached to, or near the respective physical devices, and/or sensor readings from inspection devices. The data collection unit 110 may include a receiver configured to receive the observation data from the sensors. The maintenance staff may employ inspection devices to obtain the sensor readings regularly, or on an ad-hoc basis. The maintenance staff may also manually input the monitoring data into the data collection unit 110 based on reports. The data collection unit 110 may serve to gather, categorize or sort the monitoring data into a readable format, for observing each physical device's condition. The maintenance management unit 120 may determine an optimal combination of physical devices to be maintained, and may control maintenance of the optimal combination of physical devices. The maintenance management unit 120 may be a controller. The maintenance management unit 120 may generate and manage work orders related to the physical devices. The generated work order may contain information such as, target physical devices of the work, type of work such as repair or replace, start and end time of the work, number of staff to be assigned, cost estimate, etc. The generated work order may state the combination of physical devices to be maintained. The maintenance management unit 120 may also store information of completed and scheduled maintenance works. The maintenance management unit 120 may control the maintenance of the physical devices according to the generated work order. Alternatively, the maintenance staff may carry out the maintenance work according to the generated work order.

The user interface unit 140 may display the generated work order, for example on a screen of the user interface unit 140. The user interface unit 140 may present a Graphical User Interface (GUI). The GUI may display information to the user in the form of text and multimedia, such as icons, image, diagram, charts, shapes and movie playback. The GUI may also receive user inputs through the user's interactions with GUI objects such as buttons, forms, text boxes, checkboxes, radio button, mouse movement, mouse selection, mouse release, etc. The user interface unit 140 may include an image display apparatus, such as a Liquid Crystal Display (LCD) or a plasma display so as to physically present the GUI. The user interface unit 140 may also include user input apparatuses such as keyboards, mouse, touch screen, etc, for receiving the user's inputs.

The user interface unit 140 may include a transceiver configured to send the generated work order to distributed devices or terminals, through a communication protocol such as email, short messaging service, or instant messages. The maintenance staff may access the generated work order through the distributed devices or terminals. The distributed devices or terminals may be for example, mobile phones, laptops, or portable devices that the maintenance staff can easily carry with them while they carry out the railway maintenance work. The maintenance staff may request to view monitoring data, through the user interface unit 140. Upon receipt of the request, the user interface unit 140 may send an instruction to the maintenance management unit 120. The maintenance management unit 120 may extract the requested monitoring data from the data collection unit 110, and then relay the monitoring data to the user interface unit 140 to be displayed. The user interface unit 140 may present the monitoring data, for example, in the form of text descriptions, tables, or charts. After viewing the monitoring data, the maintenance staff may decide to operate the maintenance management unit 120 using the user interface unit 140, to generate a work order for a particular physical device or a plurality of physical devices. The user interface unit 140 may receive user inputs, such as user inputs for modifying data records of physical device information handled by or stored in the maintenance management unit 120.

The decision support unit 130 may determine the optimal maintenance work tasks for a selected physical device. The maintenance management unit 120 may generate the work order based on the determination of the decision support unit 130. The decision support unit 130 may be configured to perform simulations of maintenance performance of different maintenance work plans. The decision support unit 130 or the maintenance management unit 120 may select the optimal combination of physical devices to maintain, that provides the best simulation results. The maintenance performance may include, or may be indicative of, for example, maintenance cost, service availability index, etc. The different maintenance work plans, may for example, include different number of physical devices for maintenance at the same time, or different selection of physical devices for maintenance at the same time.

The decision support unit 130 may perform simulations based on simulation models. The simulation models may include for example, system dynamics model which may be expressed by a causal loop diagram constructed from nodes of variables and formulas that are inter-correlated. The nodes may virtually represent various maintenance operation aspects such as number of physical devices in operation, number of backup physical devices, number of physical devices that need to be repaired, number of physical devices that need to be replaced, total number of staff, maintenance work time slot duration, material cost, manpower cost, transportation cost, total costs, train availability/service quality, revenue, etc. The simulation model may be built based on real life data collected from actual maintenance operations. The simulations may show how a particular node may be affected by changes in the values of other nodes over time.

Figure 2A:
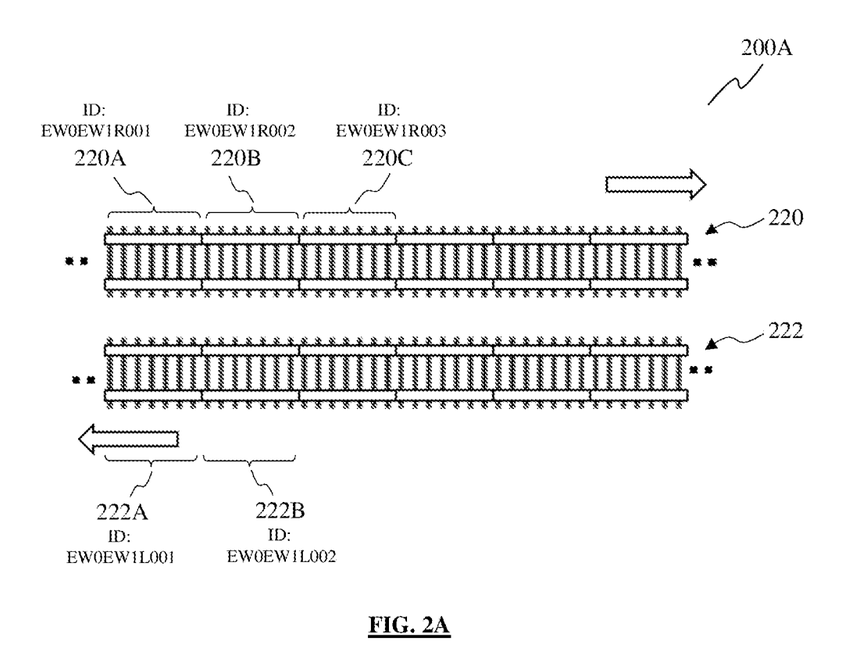
FIG. 2A shows an illustration of an example of physical devices according to various embodiments.

FIG. 2A shows an illustration 200A of an example of physical devices according to various embodiments. In the example, the physical devices are components of a track on a railway. The illustration 200A shows a section of a first track line 220 for trains running in a first direction and a corresponding section of a second track line 222 for trains running in a second direction opposing the first direction. Each of the first track line 220 and the second track line 222 may be made up of a plurality of track segments. The first track line 220 may include track segments 220A, 220B, 220C and other track segments (not labelled). The second track line 222 may include track segments 222A, 222B and other track segments (not labelled). Each track segment may be individually replaceable or repairable. Each track segment may be given a unique identifier (ID). The control arrangement 100 may recognize each track segment as an individual physical device, and may identify each track segment based on its unique ID.

Figure 2B:
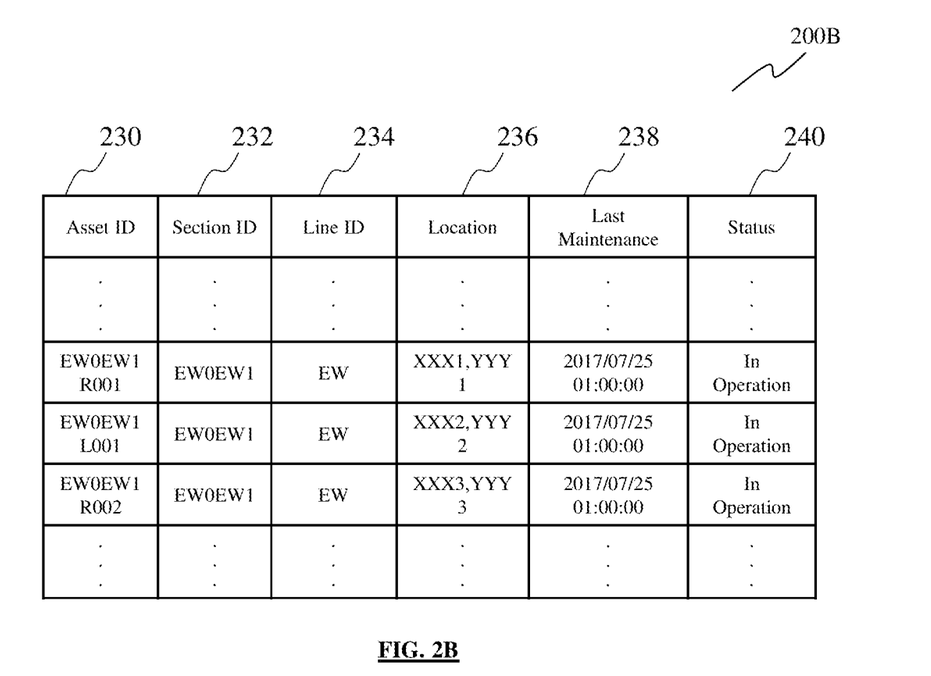
FIG. 2B shows an example device data table of the physical devices of FIG. 2A.

FIG. 2B shows an example device data table 200B of the observation data of the physical devices of FIG. 2A. The device data table 200B may be part of the data collection unit 110, or may be generated by the data collection unit 110. The device data table 200B may include information on each physical device. For example, the device data table 200B may include an asset ID column 230, a section ID column 232, a line ID column 234, a location column 236, a last maintenance column 238 and a status column 240. The asset ID column 230 may list the ID of each physical device—in the case of the example of FIG. 2A, the physical device may be the individual track segment. The section ID column 232 may list the identifier of a line section that the physical device belongs to. Using the same example, the section may be the section of the track line shown in FIG. 2A. A line section may be part of a track line. The line section may describe the position range between adjacent stations. The line ID 234 column may list the identifier of the track line that the physical device belongs to, for example, the first track line 220 and the second track line 222 may be identified as "EW", referring to the East-West Line of the Mass Rapid Transit System. The track line may be part of an overall railway network. The track line may be identified by a train transportation range, in other words, a range that stretches from a departing point station to the last destination point station in the train transportation route. The location column 236 may list the location of each physical device. The location may be expressed by latitude and longitude coordinates which may be acquired by, for example, the Global Positioning System (GPS). The maintenance staff may use the location information, in combination with the line ID and the section ID to find the track segment. The last maintenance column 238 may list the temporal information (e.g. date and/or time) of the most recent maintenance activity performed on each physical device. In the example shown, the date is listed in the format of "DD/MM/YYYY" where "DD" is the day in two digits, "MM" is the month in two digits and "YYYY" is the year in four digits; while time is listed in the format of "hh:mm:ss" where "hh" is the hour in two digits, "mm" is the minute in two digits and "ss" is the second in two digits. This temporal value may be acquired from manual user input received through the user interface unit 140, or from digital readings received from field maintenance equipment after completion of a maintenance task. The status column 240 may list the current condition of each physical device. The status column 240 may have multiple values which express different types of conditions. In the example device data table 200B, the value of "in operation" may indicate that the particular physical device is working properly and is being used. Other possible values for the status column 240 may include "under maintenance" to indicate that the particular physical device is under maintenance and is not usable at the current moment, or "failure" to indicate that the particular physical device has failed to function and requires immediate attention, or "near end-of-life" to indicate that the particular physical device may be about to fail and requires maintenance. The device data table 200B may further include a column listing the most recent maintenance activity performed on each physical device. The device data table 200B may be stored in a memory or storage module of the control arrangement 100. The control arrangement 100 may use the asset ID to differentiate one physical device from another physical device. The asset ID of each physical device may be allocated to the physical device when the physical device is registered as a new physical device managed by the control arrangement 100. After registration, the physical device's status may be set for example "at backup storage" if at the time of registration, the physical device is being stored in the backup warehouse. The control arrangement 100 may consistently use the same asset ID to refer to the same physical device in other data tables within the control arrangement 100. The device data table 200B may be editable by the user, for example, through the user interface unit 140, or using a separate database system.

Figure 3:
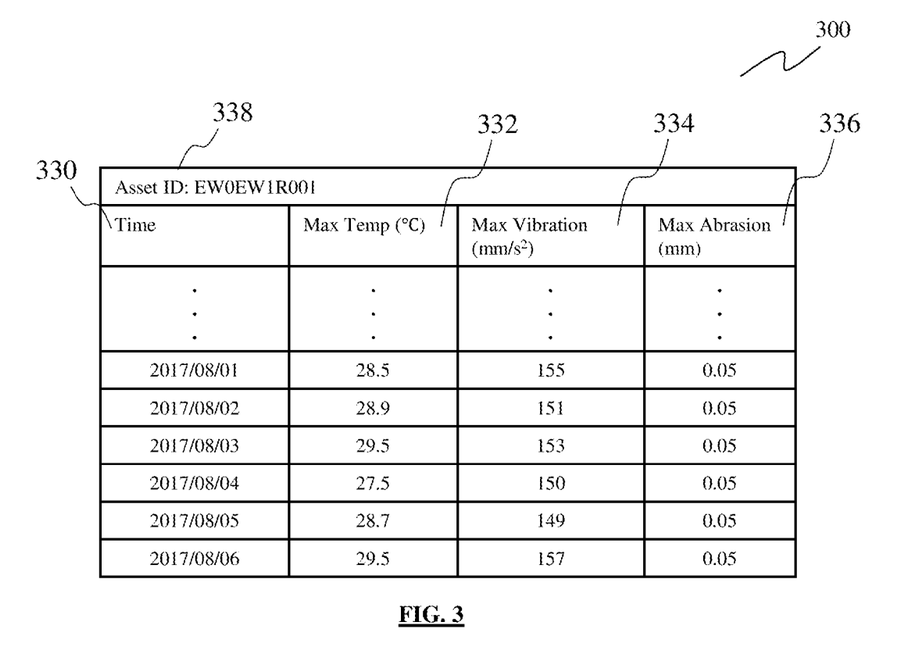
FIG. 3 shows an example of an observation data table according to various embodiments.

FIG. 3 shows an example of an observation data table 300 according to various embodiments. The control arrangement 100 may store an observation data table 300 for each physical device managed by the control arrangement 100. The observation data table 300 may be part of the data collection unit 110, or may be generated by the data collection unit 110. The data in the observation data table 300 may be populated by, or obtained from, sensors attached to the physical devices, over a stretch of time. The observation data table 300 may hold detailed records of the condition of a physical device. The observation data table 300 may include a header 338 which may state the asset ID, to indicate that the data in the table relate to the physical device that identified by the asset ID. The asset ID value in the header may be identical to the asset ID used for the same physical device, in the device data table 200B. The observation data table 300 may include a time column 330. The time column 330 may show the date and/or time when the sensor measurements of the physical device were taken. The time column 330 shown is in the format of "DD/MM/YYYY", similar to that in the device data table 200B. The time column 330 may also include the time of the day when the sensor measurements are taken. The observation data table 300 may further include various columns indicating different types of measurements of the physical device. For example, the observation data table 300 may include a first measurement column 332 that indicates the maximum temperature read for the physical device in one day. The temperature of the physical device may be read several times in one day, but the readings may be filtered to find the maximum value for entering into the observation data table 300. The observation data table 300 may include a second measurement column 334 indicating the maximum vibration read for the physical device in one day. The observation data table 300 may include a third measurement column 336 indicating the maximum abrasion read for the physical device in one day.

Figure 4:
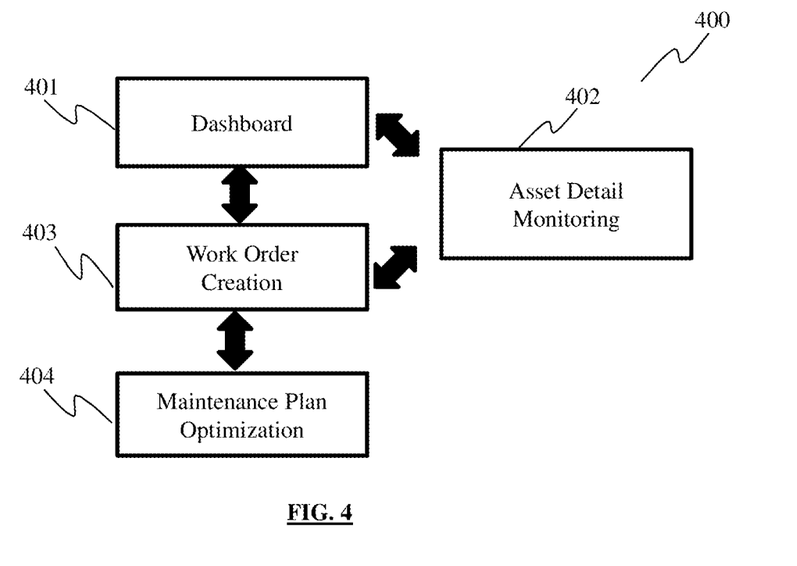
FIG. 4 shows an operation flow diagram of an example of how a user may operate a control arrangement according to various embodiments.

FIG. 4 shows an operation flow diagram 400 of an example of how a user may operate the control arrangement 100, according to various embodiments. The user, for example, a maintenance staff or maintenance operator, may interact with the control arrangement 100 using the user interface unit 140. The user interface unit 140 may present a graphical user interface (GUI) to the user. The user may access a plurality of work sessions through the GUI. The plurality of work sessions may include dashboard session 401, asset detail monitoring session 402, work order creation session 403 and maintenance plan optimization session 404. The dashboard session 401 may be the initial session to be displayed on the GUI and may serve as the entry point to accessing functionalities of the control arrangement 100. The dashboard session 401 may display a summary or brief information of active physical devices being managed by control arrangement 100. From the dashboard session 401, the user may enter the asset detail monitoring session 402, or the work order creation session 403. In the asset detail monitoring session 402, the monitoring data of the selected physical device may be displayed in the GUI. Upon reviewing the monitoring data in the asset detail monitoring session 402, the user may decide to create a specific maintenance work order for a particular physical device. To do so, the user may enter the work order creation session 403. If the user does not wish to create a maintenance work order, the user may choose to return to the dashboard session 401.

In the work order creation session 403, the user may create a maintenance work order (herein referred to simply as a work order) for a specific physical device. After creating the work order, the user may switch back to the asset detail monitoring session 402 to view monitoring data of other physical devices, or return to the dashboard session 401. During the creation of a work order, the user may define the maintenance work content, in other words, the maintenance work tasks. The maintenance work content may include, for example, which physical devices are to be maintained, the quantity of physical devices to be maintained, the proximity of the physical devices to be maintained etc. The maintenance work content may define a selection of physical devices to be maintained. The user may input into the work order, a plurality of possible alternative maintenance work content, in other words, a plurality of possible work plans. The possible work plans may also be automatically generated by the maintenance management unit 120 in the work order creation session 403, based on monitoring data from the data collection unit 110. The user may then proceed to the maintenance plan optimization session 404 to find out which work plan achieves the best outcome. The outcome may be derived, inferred or obtained from the maintenance output data. The best outcome may be measured, in terms of predefined outcome parameters, such as lowest cost, shortest time, highest cost-benefit score, minimum down time, maximum reliability, maximum operational lifespan etc. The best outcome may be measured based on any of the abovementioned parameters, or a weighted combination of a plurality of the abovementioned parameters. In the maintenance plan optimization session 404, the decision support unit 130 may evaluate the values of the outcome parameters by running simulations of the various possible work plans. The decision support unit 130, or the user may decide on the optimal work plan and set it as a work order rule. The user may then return to the work order creation session 403 to create other work orders.

Figure 5:
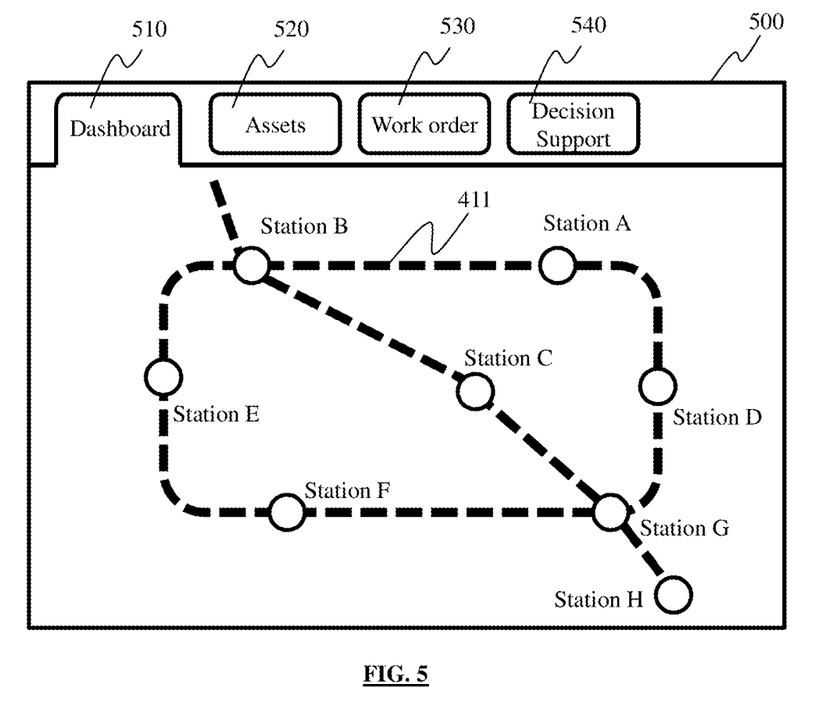
FIG. 5 shows an example of a GUI of a control arrangement, according to various embodiments.

FIG. 5 shows an example of a GUI 500 of the control arrangement 100, according to various embodiments. The GUI 500 may display locations of the physical devices managed by the control arrangement 100. The GUI 500 may include images and interactive components such as clickable buttons, to enable user interaction. The GUI 500 may include a plurality of buttons, including dashboard button 510, assets button 520, work order button 530 and decision support button 540. Each of these buttons may be clickable, such that when the user clicks on the buttons, the GUI 500 may display the corresponding page. For example, when the user clicks on the dashboard button 510, the GUI may display the dashboard page to commence the dashboard session 401. Similarly, when the user clicks on the assets button 520, the asset detail monitoring session 402 may be initiated; when the user clicks on the work order button 530, the work order creation session 403 may be initiated; and when the user clicks on the decision support button 540, the maintenance plan optimization session 404 may be initiated. The dashboard page may display a rail network map 411. The rail network map 411 may be a diagram showing rail track assets location in geographical representation. The visual representation of the rail track asset locations may be schematic, or may be geographically accurate. The rail network map 411 may be an interactive map, such that the user may click on anywhere on the rail network map 411 to access the monitoring data of the clicked portion of the network.

Figure 6:
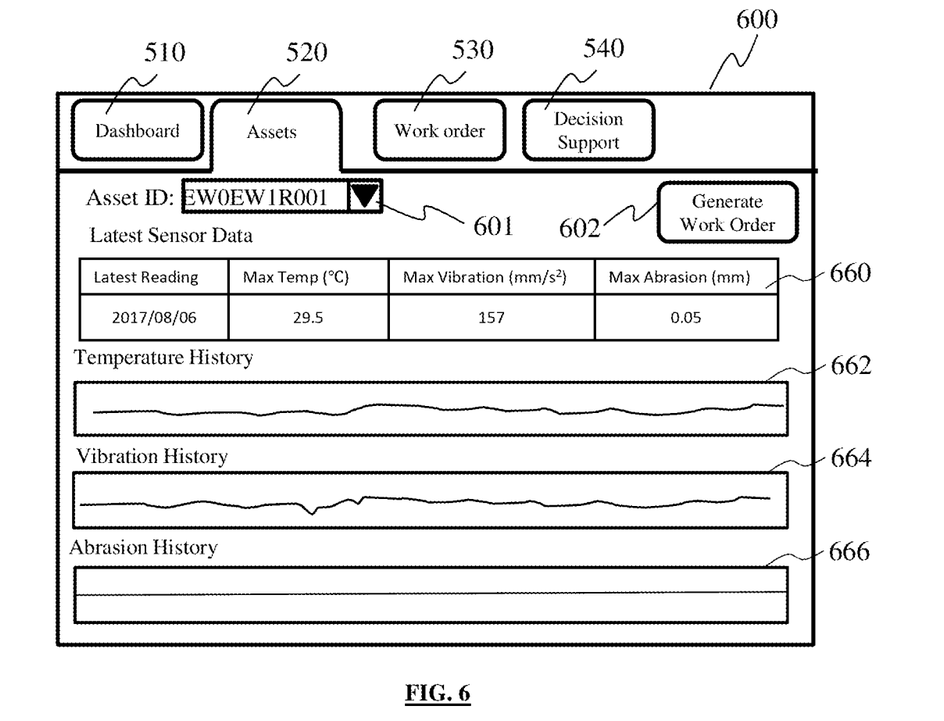
FIG. 6 shows an example of an assets page GUI of an asset detail monitoring session according to various embodiments.

FIG. 6 shows an example of an assets page 600 GUI of the asset detail monitoring session 402, according to various embodiments. On the assets page 600, the user may select the physical device to be observed, by selecting the asset ID from a menu 601, or by typing in the asset ID. The menu 601 may be a pull-down menu, or a scroll list, or any other type of GUI menu. After the physical device is selected, the assets page 600 may display the monitoring data, including for example, the latest sensor data 660, the temperature history 662, the vibration history 664 and the abrasion history 666. The assets page 600 may display other types of sensor measurements that are relevant to the selected physical device. The assets page 600 may also display the sensor measurements in other formats, other than the line graphs shown in FIG. 6. The data displayed on the assets page 600 may be generated by the data collection unit 110 by referencing to the device data table 200 and the data monitoring table 300. The user may click on the generate work order button 602 to create a maintenance work order for the selected physical device. Upon selection of the generate work order button 602, the asset detail monitoring session 402 may end and the work order creation session 403 may commence. The GUI 500 may now display the work order page.

Figure 7:
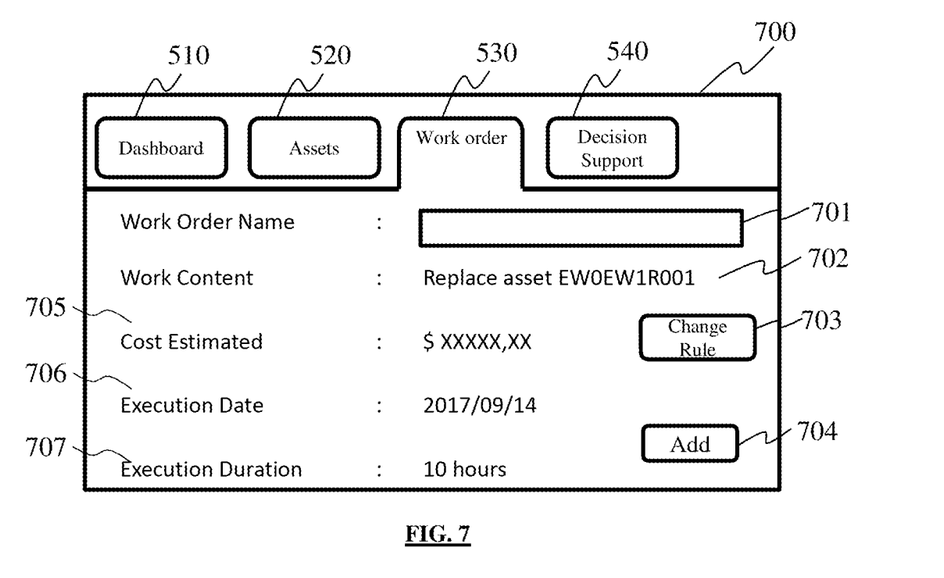
FIG. 7 shows an example of a work order page GUI of a work order creation session according to various embodiments.

FIG. 7 shows an example of a work order page 700 GUI of the work order creation session 403, according to various embodiments. On the work order page 700, the user may manually enter at least one of the contents or requirements of the new maintenance work order. Alternatively, at least one of the contents may be automatically generated by the maintenance management unit 120. Optionally, the user may amend the automatically-created contents. The work order page 700 may include a plurality of fields, including for example, the work order name 701, the work content 702, the estimated cost 705, the execution date 706 and the execution duration 707. The work order content 702 may be defined by a rule, for example to replace the corresponding physical device. This rule may be changed on a rule change menu which may be accessed by clicking the change rule button 703. The estimated cost 705, execution date 706 and execution duration 707 may be set and calculated automatically. The user may activate the new maintenance work order by clicking the add button 704. The user may edit any one of the estimated cost 705, the execution date 706 or the execution duration 707. The work order page 700 may also include another button for accessing a list of generated work orders. The list of generated work orders may include separate categories of completed work orders, pending work orders, rejected work orders etc. The list may also record edits made to the work orders, as well as status changes of the work orders. The user may retrieve the list to browse through the generated work orders. The user may also change the status of the work order, for example from "In-progress" to "Completed". The work order list may be managed by using Data Base mechanism.

Figure 8:
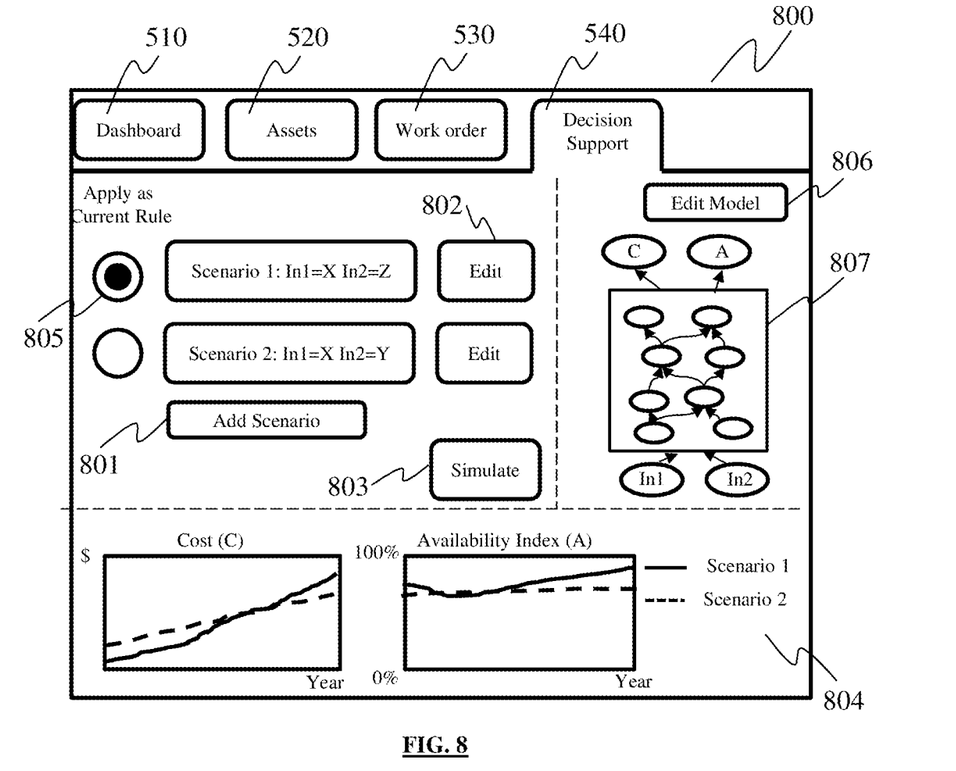
FIG. 8 shows an example of a decision support page GUI of a maintenance plan optimization session according to various embodiments.

FIG. 8 shows an example of a decision support page 800 GUI of the maintenance plan optimization session 404, according to various embodiments. The user may access the decision support page 800 by clicking on the decision support button 540, or by clicking on the change rule button 703 on the work order page 700. Using the decision support page 800, the user may instruct the control arrangement 100 to perform simulation of multiple maintenance work approaches. Each maintenance work approach may involve maintaining a different selection of physical devices. For example, a first work approach may involve replacing only one particular physical device of interest, while a second work approach may involve replacing the physical device of interest and its surrounding physical devices, while a third work approach may involve replacing the physical device of interest and its immediate neighbouring physical devices. The user may define the choice of physical devices, or the definition of "surrounding physical devices" For example, the user may define "surrounding physical devices" to be N-quantity of physical devices that are closest to the physical device of interest, where N may be an arbitrary, user-selectable quantity. The user may also define "surrounding physical devices" to be physical devices within a predefined distance D. The user may also define the selection of physical devices based on a particular characteristic of the physical devices, for example, remaining lifespan, part number, probability of failure etc. The user may also combine the criteria for selection of physical devices, i.e. based on both the characteristics and the definition of surrounding. As an example, the user may instruct the control arrangement 100 to simulate multiple maintenance work approaches, one of which may include replacing all components A (having the same part number) that has remaining lifespan of less than T and within distance D; another approach being replacing all components A that has remaining lifespan of less than T and being N physical devices closest to the physical device of interest. The control arrangement 100 may compare the outcome of these different maintenance work approaches. The user may click on the add scenario button 801 to add new scenarios. Each scenario may be governed by the criteria or rules, i.e. values of N, D, T etc. The user may click on the edit button 802 to amend or to remove the created scenarios. After defining the scenarios to be compared, the user may click on the simulate button 803 to perform the simulations. The decision support page 800 may display the simulation results. The simulation results may be presented in the form of graphs 804. The user may easily see the differences in outcome of using the different work maintenance approaches, and thus may apply the best maintenance work approach as the current rule, by making the rule selection 805. The user may edit the simulation model by clicking the edit model button 806. Upon clicking the edit model button 806, the GUI may shift to a model editing page. The decision support unit 130 may generate the various work maintenance approaches automatically, or alternatively, the user may create the various work maintenance approaches.

An example of a simulation model is represented as diagram 807 in FIG. 8. The simulation model may contain two input nodes, In1 and In2. As an illustrative example, In1 may define the threshold for remaining lifespan, while In2 may be the number of physical devices to be replaced at the same time (an physical device of interest and its surrounding physical devices) which have remaining lifespan less than the aforementioned threshold. The definition of whether an physical device is within the surrounding of another physical device may be defined by a condition, for example by distance such as within a radius of 30 meters, etc. The definition may also be expressed as a node, as part of the simulation model. The simulation model may contain two output nodes A and C, which may reflect the outcomes, i.e. measures of the maintenance performance. As an example, node A may indicate the overall maintenance cost, while node C may indicate the service availability index of the train service.

Figure 9:
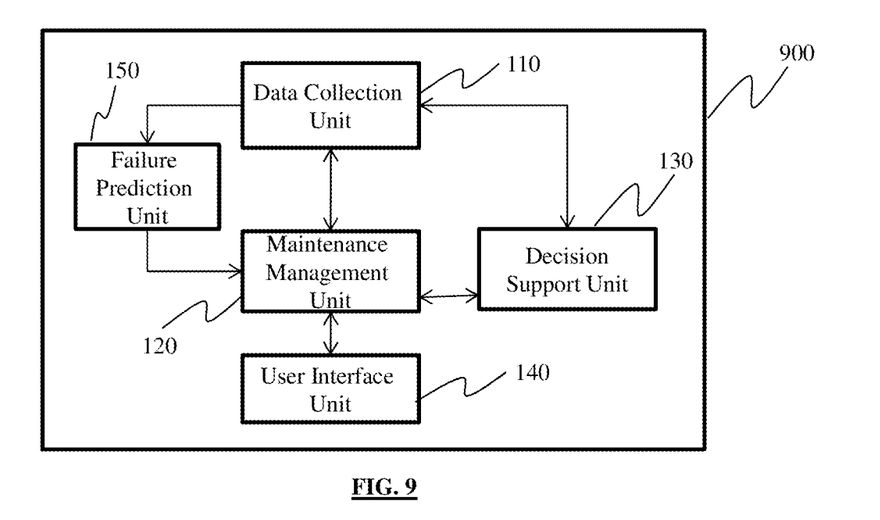
FIG. 9 shows a schematic diagram of a control arrangement according to various embodiments.

FIG. 9 shows a schematic diagram of a control arrangement 900 according to various embodiments. The control arrangement 900 may include the control arrangement 100. The control arrangement 900 may be similar to the control arrangement 100 in that it may also include a data collection unit 110, a maintenance management unit 120, a decision support unit 130, and a user interface unit 140. The control arrangement 900 may further include a failure prediction unit 150. The failure prediction unit 150 may be configured to estimate the remaining lifespan of physical devices or the probability of failure of the physical devices. The failure prediction unit 150 may include a failure prediction model. The failure prediction model may be created based on historical data, statistics, or based on machine learning method. The failure prediction model may also include combinations of transfer functions that utilize threshold values to evaluate the monitoring data stored in the asset monitoring data table 300. The failure prediction unit 150 may retrieve monitoring data from the data collection unit 110, process the monitoring data using the failure prediction model, and then generate a predicted failure figure. The predicted failure figure may indicate the remaining lifespan of the physical devices, for example, if the figure is "30 days", the evaluated physical device may be expected to fail after 30 days. The predicted failure figure may also indicate the probability of failure of an evaluated physical device, for example if the figure is "90%", the evaluated physical device may have a 90% likelihood of failing. The predicted failure figure may also indicate the probability of failure within a time duration, for example the figure may be "90% in 7 days", which may indicate that the evaluated physical device has a 90% likelihood of failing within 7 days. The failure prediction unit 150 may periodically check the most recent data in the asset monitoring data table 300, to perform the predictions. The failure prediction unit 150 may generate an alert message when the predicted failure figure meets or exceeds a predetermined threshold. For example, the failure prediction unit 150 may generate the alert message when the remaining lifespan of the physical device is less than 30 days, or if the probability of failure is higher than 70%. The failure prediction unit 150 may send the alert message to the maintenance management unit 120. The maintenance management unit 120 may relay the alert message to the user interface unit 140, for displaying the alert message to the user. Upon receiving the alert message, the maintenance management unit 120 may generate a recommended maintenance work approach, with the assistance of the decision support unit 130.

Figure 10:
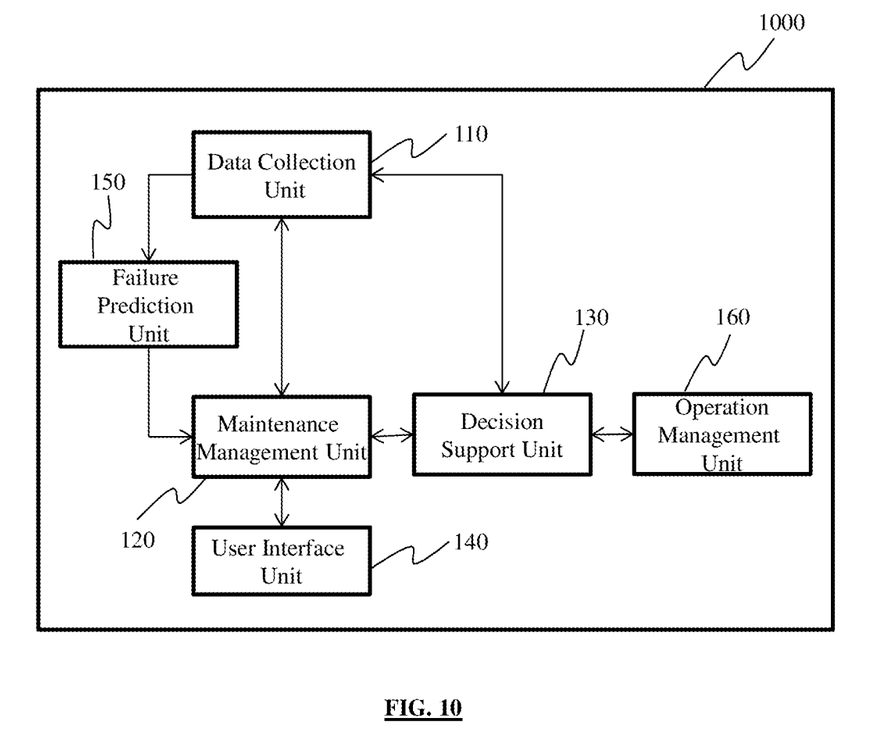
FIG. 10 shows a schematic diagram of a control arrangement according to various embodiments.

FIG. 10 shows a schematic diagram of a control arrangement 1000 according to various embodiments. The control arrangement 1000 may include the control arrangement 100 or the control arrangement 900. The control arrangement 1000 may be similar to the control arrangement 900 in that it may also include a data collection unit 110, a maintenance management unit 120, a decision support unit 130, a user interface unit 140 and a failure prediction unit 150. The control arrangement 1000 may further include an operation management unit 160. The operation management unit 160 may be configured to generate and manage train service operation orders. The generated service operation orders may include at least one of operation commands, information on the operation line and section, information of the corresponding train type, the start and end time of the particular operation order to be executed, etc. Operation commands may include, for example but not limited to, service stop which is a request to stop a particular train service; service start which is a request to start a particular train service; and set headway to N which sets the time distance between one train and the next train to be N minutes, etc. Service operation order may be displayed on the screen through the user interface unit 140, or may also be sent through a communication protocol such as email, Short Messaging Service (SMS), etc., to devices or terminals where the actual service operator have access, so they may execute the train service operation orders accordingly. The operation management unit 160 may provide the train service operation orders to the decision support unit 130, so that the decision support unit may take into consideration, various train service operation orders, in simulating the outcomes of various scenarios. In other words, in addition to simulating the outcomes of various maintenance work approaches, the decision support unit may simulate outcomes of various scenarios that include maintenance work approaches and train service operation orders. The decision support unit may also compare the outcomes of scenarios of performing only maintenance work approaches, versus changing the train service operation order. For example, if the failure prediction unit 150 generated an alert message indicating that a physical device is about to expire, the decision support unit 130 may compare the outcomes of possible actions such as (a) repairing the physical device; (b) reducing operation time; or (c) reducing operation time and repairing the physical device, and thus, determine the optimum solution to the problem of the expiring physical device.

Figure 11:
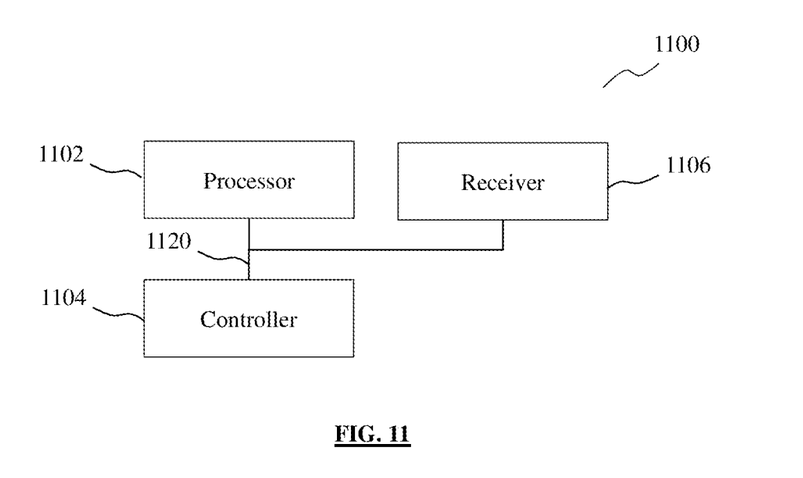
FIG. 11 shows a conceptual diagram of a control arrangement according to various embodiments.

FIG. 11 shows a conceptual diagram of a control arrangement 1100 for maintenance of a collection of physical devices, according to various embodiments. The control arrangement 1100 may be identical to, or at least substantially similar to, or include, or be part of, the control arrangement 100, the control arrangement 900 or the control arrangement 1000. The control arrangement 1100 may include a receiver 1106 configured to receive observation data representative of physical conditions of each physical device of the collection of physical devices. The control arrangement 1100 may further include a processor 1102 configured to compute respective maintenance output data of maintaining different combinations of the physical devices, based on the observation data. The control arrangement 1100 may further include a controller 1104 configured to determine the combination of the physical devices to be maintained based on a comparison of the respective maintenance output data. The controller 1104 may be further configured to control maintenance of the determined combination of the physical devices. The processor 1102, the controller 1104 and the receiver 1106 may be coupled with each other, like indicated by lines 1120, for example communicatively coupled through a communication network, electrically coupled, for example using a line or a cable, and/or mechanically coupled.

In other words, according to various embodiments, the controller arrangement 1100 may include a processor 1102, a controller 1104 and a receiver 1106. The controller arrangement 1100 may be used to maintain a plurality of physical devices, also referred herein as a collection of physical devices. The collection of physical devices may be interrelated in functionality, or may be coupled for example, mechanically, electrically and/or communicatively. The collection of physical devices may form a physical system such as a power plant, a railway system, a networked system, a building, a telecommunications system, an oil rig, hospital equipment or client-server systems. The processor 1102 may include, or may be part of, the decision support unit 130. The controller 1104 may include, or may be part of, the maintenance management unit 120. The receiver 1106 may be configured to receive observation data, also referred herein as monitoring data. The observation data may be representative of physical conditions of each physical device in the collection of physical devices. The receiver 1106 may include, or may be part of, the data collection unit 110. The processor 1102 may be configured to compute respective maintenance output data of maintaining different combinations of the physical devices based on the received observation data. Each combination may be unique. Each combination of the physical devices may be different from the other combinations of the physical devices in at least one of quantities of the physical devices, types of the physical devices, distances between the physical devices, or physical conditions of the physical devices. The maintenance output data may be indicative of at least one of life cycle cost, maintenance duration, reliability, or operational performance, of the collection of the physical devices. The controller 1104 may be configured to determine the combination of the physical devices to be maintained based on a comparison of the computed respective maintenance output data. The controller 1104 may be further configured to control maintenance of the determined combination of the physical devices. The processor 1102 may be configured to compute the maintenance output data of each combination of the physical devices based on the observation data of the physical devices in the respective combination. The comparison of the respective maintenance output data of the different combinations may be generated by at least one of the processor 1102 or the controller 1104. The processor 1102 may include a simulator configured to simulate maintenance of the different combinations of the physical devices. The processor 1102 may be configured to compute the respective maintenance output data based on the simulations of the maintenance of different combinations of the physical devices as performed by the simulator.

Figure 12:
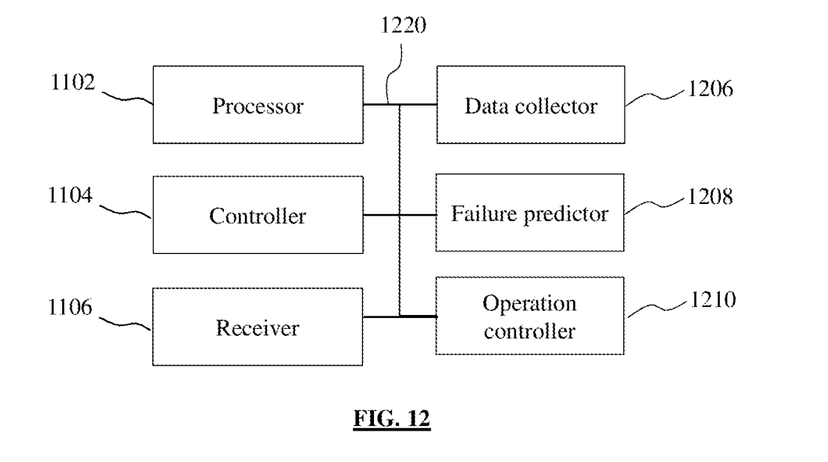
FIG. 12 shows a conceptual diagram of a control arrangement according to various embodiments.

FIG. 12 shows a conceptual diagram of a control arrangement 1200 according to various embodiments. The control arrangement 1200 may include the control arrangement 1100, in that it may also include the processor 1102, the controller 1104 and the receiver 1106. In addition, the control arrangement 1200 may include a data collector 1206, a failure predictor 1208 and an operation controller 1210. The data collector 1206 may include, or may be part of, the data collection unit 110. The failure predictor 1208 may include, or may be part of, the failure prediction unit 150. The data collector 1206 may store the observation data. The data collector 1206 may be configured to transmit the observation data to the receiver 1106, for example, through a communication network. The data collector 1206 may include sensors coupled to the physical devices. The sensors may be configured to generate the observation data by sensing the physical conditions of the physical devices. The failure predictor 1208 may be configured to predict failure of the physical devices based on the observation data. The controller 1104 may be configured to determine the combination of physical devices to be maintained, further based on the predicted failure of the physical devices by the failure predictor 1208. The processor 1102 may be configured to compute the respective maintenance output data of the different combinations of the physical devices further based on the predicted failure of the physical devices by the failure predictor 1208. Alternatively, or in addition, the processor 1102 may be configured to compute the respective maintenance output data of the different combinations of the physical devices further based on operational data received from the operation controller 1210. The operation controller 1210 may include, or may be part of, the operation management unit 160. The processor 1102, the controller 1104, the receiver 1106, the data collector 1206, the failure predictor 1208 and the operation controller 1210 may be coupled with each other, like indicated by lines 1220, for example communicatively coupled through a communication network, electrically coupled, for example using a line or a cable, and/or mechanically coupled.

Figure 13:
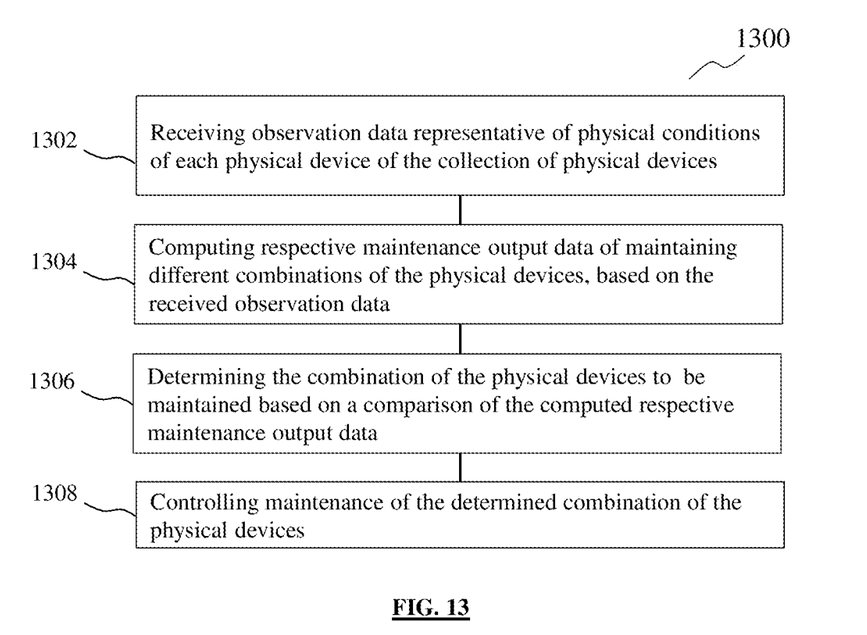
FIG. 13 shows a flow diagram of a method for controlling maintenance of a collection of physical devices according to various embodiments.

FIG. 13 shows a flow diagram 1300 of a method for controlling maintenance of a collection of physical devices according to various embodiments. The method may include processes 1302, 1304, 1306 and 1308. The process 1302 may include receiving observation data representative of physical conditions of each physical device of the collection of physical devices. The processor 1302 may be performable by the receiver 1106. The process 1304 may include computing respective maintenance output data of maintaining different combinations of the physical devices, based on the received observation data. The processor 1304 may be performable by the processor 1102. The process 1306 may include determining the combination of the physical devices to be maintained based on a comparison of the computed respective maintenance output data. The process 1308 may include controlling maintenance of the determined combination of the physical devices. The processes 1306 and 1308 may be performable by the controller 1104.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced. It will be appreciated that common numerals, used in the relevant drawings, refer to components that serve a similar or the same purpose.

It will be appreciated to a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only. C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A control arrangement for maintenance of a collection of physical devices, the control arrangement comprising:

a receiver configured to receive observation data, the observation data representative of physical conditions of each physical device of the collection of physical devices;

a failure predictor configured to calculate a probability of failure of the physical devices with a time duration based on the observation data;

a processor configured to compute respective maintenance output data of maintaining different combinations of the physical devices, based on the probability of failure and the observation data; and a controller configured to determine the combination of the physical devices to be maintained based on a comparison of the computed respective maintenance output data, the controller further configured to control maintenance of the determined combination of the physical devices.

2. The control arrangement of claim 1, wherein the processor is configured to compute the maintenance output data of each combination of the physical devices based on the observation data of the physical devices in the respective combination.

3. The control arrangement of claim 1, wherein at least one of the processor and the controller is further configured to generate the comparison of the respective maintenance output data of the different combinations.

4. The control arrangement of claim 1, further comprising:

a data collector having stored therein the observation data.

5. The control arrangement of claim 4, wherein the data collector is configured to transmit the observation data to the receiver.

6. The control arrangement of claim 4, wherein the data collector comprises sensors coupled to the physical devices, the sensors configured to generate the observation data by sensing the physical conditions of the physical devices.

7. The control arrangement of claim 1, wherein the processor comprises a simulator configured to simulate maintenance of the different combinations of the physical devices, wherein the processor is further configured to compute the maintenance output data based on the simulations by the simulator.

8. The control arrangement of claim 1, wherein each combination of the physical devices is different from the other combinations of the physical devices in at least one of quantities of the physical devices, types of the physical devices, distances between the physical devices, or physical conditions of the physical devices.

9. The control arrangement of claim 1, wherein the maintenance output data is indicative of at least one of life cycle cost, maintenance duration, reliability, or operational performance, of the collection of physical devices.

10. The control arrangement of claim 1, wherein the controller is configured to determine the combination of physical devices to be maintained, further based on the probability of failure of the physical devices by the failure predictor.

11. The control arrangement of claim 1, wherein the processor is configured to compute the respective maintenance output data of the different combinations of the physical devices further based on operational data received from an operation controller.

12. The control arrangement of claim 11, further comprising:

the operation controller.

13. A method for controlling maintenance of a collection of physical devices, the method comprising:

receiving observation data representative of physical conditions of each physical device of the collection of physical devices;

calculating a probability of failure of the physical devices with a time duration based on the observation data;

computing respective maintenance output data of maintaining different combinations of the physical devices, based on the probability of failure calculated and the received observation data;

determining the combination of the physical devices to be maintained based on a comparison of the computed respective maintenance output data; and controlling maintenance of the determined combination of the physical devices.

* * * * *